(12) United States Patent
Clerici et al.

(10) Patent No.: US 7,309,528 B2
(45) Date of Patent: Dec. 18, 2007

(54) PROTECTIVE COATING COMPOSITION

(75) Inventors: Vittorio Clerici, Oestrich-Winkel (DE); Alexandra Wilhelmi, Ingelheim (DE)

(73) Assignee: Dow Corning GmbH, Wiesbaden (DE)

( * ) Notice: Subject to any disclaimer, the term of this patent is extended or adjusted under 35 U.S.C. 154(b) by 0 days.

(21) Appl. No.: 10/475,763

(22) PCT Filed: Apr. 23, 2002

(86) PCT No.: PCT/EP02/04529

§ 371 (c)(1),
(2), (4) Date: Oct. 16, 2003

(87) PCT Pub. No.: WO02/088262

PCT Pub. Date: Nov. 7, 2002

(65) Prior Publication Data

US 2004/0137238 A1    Jul. 15, 2004

(30) Foreign Application Priority Data

May 1, 2001    (GB) ................................. 0110627.7
Oct. 27, 2001    (GB) ................................. 0125848.2

(51) Int. Cl.
C09D 5/08    (2006.01)
B32B 15/08    (2006.01)
B32B 15/18    (2006.01)

(52) U.S. Cl. ...................... 428/446; 428/450; 428/470; 428/472; 428/484.1; 252/388; 252/389.3; 252/389.31

(58) Field of Classification Search ................ 252/388, 252/389.2, 389.3, 389.31, 389.52; 428/446, 428/448, 424.7, 424.8, 543
See application file for complete search history.

(56) References Cited

U.S. PATENT DOCUMENTS

| | | | |
|---|---|---|---|
| 3,671,483 A | 6/1972 | Young | ................. 260/32.85 B |
| 3,832,204 A | 8/1974 | Boaz | |
| 3,846,359 A | 11/1974 | Rosteing | ................... 360/22 S |
| 4,098,749 A | 7/1978 | Hoshino et al. | ....... 260/30.6 R |
| 4,209,555 A | 6/1980 | Stewart | |
| 4,218,354 A | 8/1980 | Hayati et al. | .......... 260/29.2 M |
| 4,290,811 A | 9/1981 | Brown et al. | |
| 4,341,558 A | 7/1982 | Yashiro et al. | ........... 106/14.12 |
| 4,645,790 A | 2/1987 | Frey et al. | |
| 5,324,545 A | 6/1994 | Flamme | ...................... 427/406 |
| 5,393,611 A | 2/1995 | Flamme | ...................... 428/450 |
| 5,593,492 A | 1/1997 | Schaffer et al. | |
| 5,720,902 A | 2/1998 | Zefferi et al. | .......... 252/389.31 |
| 5,969,019 A * | 10/1999 | Kanai et al. | ................. 524/140 |
| 2004/0127625 A1 | 7/2004 | Clerici et al. | |

FOREIGN PATENT DOCUMENTS

| | | |
|---|---|---|
| DE | 3329158 | 2/1985 |
| DE | 3920297 | 6/1989 |
| EP | 0347049 | 12/1989 |
| EP | 0444662 | 9/1991 |
| GB | 1212424 | 5/1968 |
| GB | 1360452 | 9/1971 |
| GB | 1380748 | 12/1972 |
| GB | 1499556 | 2/1978 |
| GB | 0808883 | 11/1997 |
| GB | 0976795 A2 * | 2/2000 |
| JP | 63-90577 | 4/1988 |
| JP | 2001-079489 | 3/2001 |
| JP | 04-504584 | 9/2007 |
| WO | WO88/05177 | 8/1988 |
| WO | 90/15852 | 12/1990 |
| WO | 97/13888 | 4/1997 |
| WO | WO98/24164 | 6/1998 |
| WO | WO01/85854 | 11/2001 |
| WO | 02/088262 | 11/2002 |

OTHER PUBLICATIONS

Exhibit 1-partail translation of Japanese Patent Application 63-92577 "Heat Resistant Coating Composition".

* cited by examiner

*Primary Examiner*—Jennifer C. McNeil
*Assistant Examiner*—Jason L. Savage
(74) *Attorney, Agent, or Firm*—Howard & Howard Attorneys, P.C.

(57) ABSTRACT

A protective coating composition comprising a silicate, such as an organosilicate, an organosilicate polymer and colloidal silica and an organic titanate, preferably a titanate chelate or a titanate ester in a suitable organic solvent. The composition is free from metal particles.

16 Claims, No Drawings

PROTECTIVE COATING COMPOSITION

The present invention relates to a protective coating composition for coating onto metal substrates, particularly metal substrates which have been pre-treated with a means of inhibiting corrosion such as galvanisation or a corrosion inhibiting coating which contains metal particles such as zinc and optionally aluminum.

Traditionally galvanisation has been the primary means of applying a protective metallic layer onto a metal substrate. Galvanic layers are often subsequently passivated or phosphatised as a further means of protection against corrosion. Passivation may be defined as the chemical treatment of galvanised or stainless steel with a mild oxidant, such as a nitric acid which may facilitate the formation of a thin, transparent oxide film, typically derived from a chromium III or Chromium VI containing solution that protects the steel from selective oxidation. Phosphatisation is the treatment of the steel or galvanized steel with a phosphate such as iron phosphate as a means of protecting the steel against corrosion. A top-coat may also be applied in the form of a lacquer or resin or the like.

One problem with steel substrates treated using the above processes is that the resulting substrates have poor anti-friction properties and as such it is often required for such treated substrates to have an anti-friction coating applied on top of the passivation layer. However such anti-friction layers provide the substrate with little, if any, additional corrosion resistance and may indeed reduce the level of corrosion resistance provided by traditional galvanic and passivation/phosphatised treatments.

Top-coats for galvanized steel are discussed in U.S. Pat. No. 5,393,611 and U.S. Pat. No. 5,324,545 both of which relate to a dip-coating method for protecting chromatised or passivated galvanic layers on steel or the like using a composition of a titanic acid ester and a "so-called" organofunctional polysiloxane, preferably having between 2 and 10 siloxane repeating units and epoxy end groups. There is no clear definition of the meaning of the term organofunctional polysiloxane in either of these documents but it would seem to mean a polymer with a siloxane backbone having at least one Si-R bond where R is an unsaturated or functionally substituted hydrocarbon radical. Confusingly however the examples in U.S. Pat. No. 5,393,611 and U.S. Pat. No. 5,324,545 both teach that rather than an organofunctional polysiloxane being used the preferred silicon-containing compound is an epoxy silane, namely gamma glycidoxypropyltrimethoxysilane and there is not the remotest suggestion regarding the use of a silicate.

Corrosion inhibiting coatings for metals which are subjected to extreme weather conditions are well known in the art and generally contain corrosion inhibitors in the form of metal particles, in particular zinc and/or aluminum flakes together with a binder. The use of zinc flakes in such coatings is derived from the fact that in the presence of moisture zinc will oxidize in preference to iron, as it is less electronegative. The presence of aluminum flakes in such compositions is thought to inhibit the rate of oxidation of the zinc flakes. Such coatings are discussed in the applicant's co-pending application No WO 01/85854, as well as U.S. Pat. No. 4,218,354, GB 1380748, U.S. Pat. No. 4,098,749 and EP0808883. This type of anti-corrosion coating may also utilise protective top-coats which substantially consist of organic resins.

Corrosion inhibiting paints have also been described, for example, GB 1499556 which relates to a process for hydrolysing ethyl silicate to form a gellable liquid hydrolysate which was mixed with powders such as powdered zinc for use in an anti-corrosion paint. The ethyl silicate was acid hydrolysed and the solvent for the hydrolysis was acetone or an alcohol.

Anti-corrosion coatings, which do not necessarily contain metal particles, include WO9824164, a two component coating material for the production of electrically insulating coatings on electrosteel sheets, for solid magnetisable cores in transformers, generators and motors. The coating material comprises complexes of formula $M(OR)_4$, where M is either titanium or zirconium and R is a linear or branched, saturated or unsaturated 1-20C alkyl groups or chelating groups and a polyester, acrylic, acrylic copolymer, alkyd, phenolic or amino resin containing groups which are neutralisable or readily dispersible in aqueous media.

U.S. Pat. No. 5,720,902 describes a composition for inhibiting corrosion of low carbon steel and comprises (a) a silicate compound such as an inorganic silicate or a silicon compound containing a hydrolysable group having formula $R_nSiX_{(4-n)}$ where X is a hydrolysable group selected from alkoxy or carboxy groups and n=1–3, (b) a complex fluoro acid compound, exemplified as a fluorozirconic acid or fluorotitanic acid and (c) a crosslinking agent selected from a variety of complex organozircomium and organotitanium compounds. DE 3329158 relates to a hardenable reactive resin coating composition containing one or more water-repellents or moisture-sealing fillers or additives. The additives can be one or more silanes having alkyl, alkoxy, $OC_2H_4OCH_3$, $C_3H_6SH$, alkyl-epoxy or alkylamino, or titanates of the formula R—O—Ti (OR')$_3$ where R and R' may be for example alkoxy, acrylic acid, long-chained carboxylic acid groups, partly esterified acid groups of phosphoric, pyrophosphoric or phosphorous acid or derivatives thereof in combination with a filler such as pigment granulates or platelets of metallic Zn and/or Zn phosphate and/or borate, water-proofed kaolin or water-proofed highly-dispersed silica.

According to the present invention there is provided a protective coating composition which comprises a silicate selected from the group of organic silicates, organic polysilicates or colloidal silica and an organic titanate in a solvent, which composition is free from metal particles.

For the avoidance of doubt, it is to be understood that the term silicate is used to mean a compound which contains substantially no Si—C bonds, i.e. that carbon linkages to silicon in silicates as described in this invention are substantially always via an oxygen atom (i.e. an Si—O—C bond).

The protective coating composition in accordance with the present invention may provide an alternative protective coating to the oxide coatings based on chromium III or chromium VI compositions used in passivation processes or phosphate based coatings based on phosphatisation processes. The avoidance of the need for chromium III or chromium VI containing compositions is particularly preferred in view of current environmental concerns. It is to be understood that the term zinc alloy when used herein means any appropriate alloy of zinc such as zinc alloys with nickel, manganese and/or iron.

Alternatively the protective coating composition may be utilised as a protective top-coat on an un-galvanised metal substrate surface having a previously applied anti-corrosion coating. The use of the protective coating composition of the present invention will, for example, reduce the likelihood of flaking of metal particles contained in the previously applied anti-corrosion coating.

Suitable silicates include colloidal silica, organic silicates and organic polysilicates, with organic silicates and polysilicates being particularly preferred. Suitable organic silicates and polysilicates include silicate esters, for example silicate ester monomers (e.g. ethyl silicate), hydrolysate (e.g. silicic ester hydrolysate) although silicate ester polymers are preferred, (e.g. ethyl polysilicate).

Suitable organic titanates include titanate chelates (e.g. titanium acetylacetonate and triethanolamine titanate) and titanate esters, with the latter being preferred. Suitable titanate esters include titanate ester monomers, for example tetrabutyltitanate, tetraisooctyltitanate, and tetraiospropyltitanate, tetraethyltitanate, tetrapropyltitanates, although titanate ester polymers are preferred (e.g. butylpolytitanate, ethylpolytitanate and propylpolytitanate).

Preferably, the silicate and organic titanate combination, hereafter referred to as the binder, comprises 30 to 60% by weight more preferably 40 to 55% by weight of the silicate, and 40 to 70% by weight and more preferably 45 to 60% by weight of the organic titanate to a total of 100% by weight.

The protective coating composition of the present invention may also comprise a metal phosphate as a metal particle free anti-corrosion additive. The inventors have found that the inclusion of such an additive enhances the anti-corrosion effect of any form of zinc coating on the metal substrate. Preferred metal phosphates are zinc phosphates, including modified zinc orthophosphates (e.g. modified zinc aluminum-orthophosphatehydrate) and modified zinc polyphosphates (e.g. modified zinc aluminum-polyphosphate hydrate), with the latter being most preferred. The metal phosphate may be present in an amount of up to 33%, (for example 0.1 to 33%) by weight of the solid content of the composition of the present invention (i.e. without the solvent), preferably 5 to 20% by weight.

The protective coating composition of the present invention may further comprise a thickener, e.g. silica and/or organic modified clay, in an amount of up to 5% by weight of the solid content of the composition (for example 0.1 to 5% by weight), preferably from 1.5 to 3.5% by weight.

The protective coating composition of the present invention may still further comprise a lubricant, for example a wax, including hydrocarbon waxes and polytetrafluoroethylene (PTFE) wax, preferably a polyolefin-containing wax (e.g. micronised polypropylene hydrocarbon wax), in an amount of up to 8% by weight of the solid content of the composition (for example 0.1 to 8%), preferably from 1.5 to 4.5% by weight.

Suitable solvents for use in the protective coating composition of the present invention are well known in the art. Organic solvents are suitable, including alcohols (e.g. methanol, ethanol, propanol, butanol), ketones (e.g. acetone, methyl ethyl ketone, methyl butyl ketone, cyclohexanone), esters (e.g. butyl acetate), and mixtures thereof. However, preferred solvents are hydrocarbon solvents, in particular white spirits, due to their high evaporation rates and low levels of aromatic compounds. Particularly preferred white spirits are those containing $C_{11}$-$C_{16}$ normal, iso- and cycloalkanes.

Other components which might be added to the protective coating composition in accordance with the present invention include a colorant such as carbon black or a colouring pigment and/or a small amount of an organic resin such as an acrylic resin.

The protective coating composition of the present invention thus comprises the binder in a solvent, and preferably one or more of and most preferably each of a metal phosphate anti-corrosion additive, a lubricant, and a thickener.

Preferably, the solids content of the protective coating composition comprises, 54 to 100%, more preferably 65 to 90%, by weight of binder, up to 33%, more preferably 5 to 20% by weight of metal phosphate, up to 8%, more preferably 1.5 to 4.5% by weight of lubricant, and up to 4%, more preferably 1.5 to 3.5% by weight thickener.

Preferably the protective coating composition in accordance with the invention will comprise from 30 to 70%, most preferably 40 to 60% by weight of solvent and from 70 to 30% most preferably 60 to 40% by weight of solids as described above.

The protective coating composition of the present invention can be prepared by mixing its components together in any order using conventional apparatus, however, a preferred method comprises blending the silicate and organic titanate to form a mixture, and where present separately mixing the lubricant and/or the anti-corrosion additive and/or the thickener in an amount of solvent (between 5 and 25% by weight) to form a homogeneous additive slurry. The slurry and the mixture are then further mixed together with the remaining solvent.

The protective coating composition of the present invention may be applied to a surface by any conventional application technique, for example brushing, dipping, dip-spinning and spraying. Other common application methods include spraying drums, centrifuges, electrostatic or automatic spraying, printing and roller coating. The chosen method of application will depend upon the shape, size, weight and quantity of items to be coated. The coating thickness has an influence on the life and properties of the protective coating composition, and should in the region of about 1 to 10 µm, preferably 1 to 6 µm. Once the surface has been coated with the protective coating composition, it is dried to evaporate the solvent and cure the protective coating. The resulting protective coating layer may be cured by, for example, heating at 200° C. for 10 minutes.

As discussed above the protective coating composition may be applied directly on to galvanically deposited zinc or zinc alloy layers and the resulting protective coating negating the need for protective layers based on chromium III or chromium VI compounds and/or phosphatisation. However, where required, the protective coating composition may be applied onto such layers.

Metal substrates which are galvanised and then passivated and/or phosphatised have poor anti-friction properties and often require the subsequent application of a suitable anti-friction coating applied on top of the passivated and/or phosphatised substrate However such anti-friction coatings provide the substrate with little additional corrosion resistance and may actually reduce the level of corrosion resistance. In a further embodiment of the invention the inventors have found that application of the protective coating composition in accordance with the invention onto the substrate prior to application of one or more layers of an organic anti-friction coating provides the resulting coated substrate with significantly enhanced corrosion resistance. These anti-friction coatings may comprise a non-conductive organic or inorganic resin, for example, an epoxy, acrylic or polyurethane resin and a dry lubricant for example molybdenum disulphide, graphite or polytetrafluoroethylene (PTFE) in a solvent which may be aqueous or organic based. Examples of such products include the Molykote® product range (Dow Coming GmbH, Wiesbaden, Germany) e.g. Molykote® D 708, Molykote® D 106, Molykote® D 3484, and Molykote® 7400.

Alternatively the protective coating composition of the current invention may be used as a top-coat for anti-corrosion coatings which have previously been applied onto a metal surface. One particularly preferred combination is for the protective coating composition in accordance with the present invention to be used as a top-coat for the anti-corrosion coating disclosed in the applicants co-pending patent application WO 01/85854 in which there is provided a coating composition comprising a binder and a corrosion inhibitor comprising metal particles in a solvent. The binder comprises a silicate, preferably ethyl polysilicate and an organic titanate, and the corrosion inhibitor comprises aluminum particles and zinc particles, in particular aluminum flakes and zinc flakes.

Particularly preferred combinations of coating layers include:
1. 1, 2 or 3 coating layers of the composition in WO 01/85854 followed by 1 to 3 coating layers of the protective coating composition of the present invention
2. 1 to 3 layers of the protective coating composition of the present invention applied to a galvanized iron or steel substrate and optionally 1 to 3 layers of an organic anti-friction coating.

The protective coating composition in accordance with the present invention may thus be used to improve high corrosion resistance on both galvanic layers and anti-corrosion coatings, and optionally for-life lubrication with defined and constant coefficient of friction for articles such as automotive components, for example nuts, bolts and other fasteners, door, bonnet and boot lock parts, hinges, door stoppers, window guides, seat belt components, brake rotors and drums, and other transportation industry related parts.

Further embodiments of the present invention relate to a substrate coated with the protective coating composition as hereinbefore described and to a method of coating such a substrate with a protective coating composition as hereinbefore described.

The provision of a protective coating composition in accordance with the present invention can increase the level of corrosion protection and optionally provides "for-life" dry lubrication (i.e. the metal surface needs coating only once during its working life) with a defined and constant coefficient of friction, whilst being Chromium VI-free and not requiring expensive components as described in the prior art, for example, complex fluoro acids such as fluorozirconic and fluorotitanic acids. The provision of such a protective coating composition also provides an attractive appearance to articles coated with the coating.

The present invention will now be illustrated by way of example. All percentages are by weight. It should be understood that references to white rust refer to the formation of a white powder/substance on the coated substrate surface which is the reaction product of the zinc oxidation. Red rust is the result of the oxidation of iron. In steel products which are, at least in part, coated with a Zinc metal containing layer an observer will first notice the formation of white rust and once substantially all the available zinc has been oxidized, the formation of red rust will be observed.

EXAMPLE 1

Protective coating compositions in accordance with the present invention were prepared by mixing the materials identified below and in Table 1. Table 1 discloses protective coating compositions in accordance with the present invention. It will be seen that sample 1 omits the anti-corrosion additive zinc-aluminum phosphate. In each case the protective coating composition was applied onto bolts previously coated with an anti-corrosion coating in accordance with WO 01/85854 (hereafter referred to as the base coat) which comprised 8% by weight of ethyl polysilicate polymer, 13% polybutyl titanate, 3% aluminum pigment, 33% zinc pigment, 5% zinc-aluminum phosphate, 34% petroleum white spirit, 2% polypropylene wax, 0.6% silica and 0.6% organic modified clay.

The protective coating compositions shown in Table 1 below were prepared as follows:

The polybutyl titanate and ethyl polysilicate were added into a mixing kettle with a dissolver disk for a period of 10 minutes. Simultaneously a slurry of the silica, clay zinc-aluminum phosphate and when present Polypropylene wax in a proportion of the Petroleum white spirit (about 9% by weight of solvent in sample 2 and about 20% by weight of solvent in example 1) was prepared in an Ultra turrax homogeniser. The slurry was then added into polybutyl titanate and ethyl polysilicate mixture and the resulting mixture was mixed with the dissolver disk for a period of 30 minutes at which time the residual amount of solvent was added and the final mixture was mixed in the presence of the dissolver disk for a further 10 minutes.

TABLE 1

| Components | Sample 1 Wt % | Sample 2 Wt % |
|---|---|---|
| Petroleum white spirit | 47.45 | 43.61 |
| Polybutyl titanate | 24.34 | 22.38 |
| Ethyl polysilicate | 24.34 | 22.38 |
| Silica | 1.15 | 1.06 |
| Organic modified clay | 1.00 | 0.91 |
| zinc-aluminium phosphate | 0.00 | 8.08 |
| Polypropylene wax | 1.72 | 1.58 |
| complete: | 100.00 | 100.00 |

EXAMPLE 2

Substrate Pre-Treatment

Steel bolts, 10 mm diameter by 60 mm in length, were pretreated by sandblasting.

EXAMPLE 3

Substrate Coating

The pretreated bolts of Example 2 above were coated with 2 layers of the base coat. Each base coat layer was applied by dip spinning in a centrifuge, partial curing was carried out after the first layer was applied for 10 minutes at 200° C., followed by further dip spinning and full cure at 200° C. for 13 minutes.

Samples 1 and 2 of the protective coating composition were both applied in an identical fashion and each layer applied was cured at 200° C. for 10 minutes.

EXAMPLE 4

Corrosion Resistance

Salt spray test DIN 50021 was performed on the bolts prepared as discussed in Example 3. The results are shown in Table 2 below (average results taken from test results for 10 bolts). In each example shown two layers of the base coat were applied and only the top-coat was varied:

TABLE 2

| Coating | Time (hours) | % of red rust on head of bolt |
|---|---|---|
| Coating 4.1 (No top-coat) | 900 | 0.0 |
| Coating 4.2 (1 layer of sample 1) | 2000 | 1.7 |
| Coating 4.3 (1 layer of sample 2) | 2000 | 0.0 |
| Coating 4.4 (2 layers of sample 1) | 2000 | 1.0 |
| Coating 4.5 (2 layers of sample 2) | 2000 | 0.0 |

The above should be compared with the results provided in Table 2a in which the same test was carried out with a commercially available product which comprises zinc and aluminum particles and a binder comprising a mixture of tetrabutyltitanate and trimethoxyvinylsilane both with and without a top-coat. The results of the comparative test are provided in Table 2a. It should be appreciated that, in both comparative coatings, 2 layers of the basecoat were utilised. It is understood that the comparative top-coat is an organic resin comprising phenolic and epoxy components which may in addition comprise up to about 30% by weight of polytetrafluoroethylene (PTFE). It will be noted that the amount of red rust which appears on bolts coated with the comparative base-coat/comparative top-coat combination is significantly greater than for coatings comprising only the comparative base-coat. Furthermore, the sets of comparative results shown in Table 2a are significantly worse than the results than the results in Table 2.

TABLE 2A

| Comparative Coatings | Time (hours) | % of Red Rust on head of bolt |
|---|---|---|
| Comparative base coat (basecoat only) | 240 | 3.00 |
|  | 480 | 6 |
| Comparative base coat + top-coat (1 layer of comp top-coat) | 240 | 16.0 |

EXAMPLE 5

Lubrication

The coefficient of friction of the coated bolts prepared according to Example 3 on a steel surface was determined using an Erichsen AP 541 Bolt Testing Machine. Testing was performed on bolts having been tightened 1 and 3 times and a steel surface. Coatings 5.1, 5.2 and 5.3 are equivalent to coatings 4.1, 4.4 and 4.5 in example 4. The results are shown in Table 3 below:

TABLE 3

| Coating | Tightenings | Coeff. of friction | ±variation |
|---|---|---|---|
| 5.1 | 1 | 0.117 | 0.005 |
| 5.1 | 3 | 0.117 | 0.004 |
| 5.2 | 1 | 0.122 | 0.003 |
| 5.2 | 3 | 0.124 | 0.004 |
| 5.3 | 1 | 0.127 | 0.003 |
| 5.3 | 3 | 0.118 | 0.003 |

EXAMPLE 6

In the following examples Zinc-Iron and Zinc-Nickel galvanized steel levers were obtained from Holder of Kirchheim-Teck Germany for use as test pieces. Test pieces which were passivated with a chromium III solution were treated by Holder using their Novatec 100 process and compositions. The top-coat composition in accordance with present invention used was as defined in Sample 2 in Example 1 above and was applied in the same way as the method of application used for the protective coating composition described in Example 3 above. The test pieces coated in accordance with Table 4 below were then tested using the salt spray test DIN 50021. Heat aging was carried out by subjecting the test pieces an elevated temperature, 120° C., for 24 a period of hours. In every example the presence of a coating in accordance with the invention resulted in an extended period of time before the onset of both white and red rust.

TABLE 4

| Surface treatment | | | Time Taken for initial observation of rust (Hours) | |
|---|---|---|---|---|
| galvanic layer | passivation | Sample 2 | white rust | red rust |
| ZnFe | None | None | 24 | 48 |
| ZnFe | None | Present | 48 | 120 |
| ZnFe | None | Present (heat aged) | 48 | 120 |
| ZnFe | Cr III based | None | 72 | 120 |
| ZnFe | Cr III based | present | 192 | 288 |
| ZnFe | Cr III based | Present (heat aged) | 192 | 288 |
| ZnNi | None | None | 24 | 120 |
| ZnNi | None | Present | 336 | 600 |
| ZnNi | None | Present (heat aged) | 264 | 600 |
| ZnNi | Cr III based | None | 192 | 288 |
| ZnNi | Cr III based | present | 696 | No red rust detected after 1848 hours when test terminated |
| ZnNi | Cr III based | Present (heat aged) | 912 | |

EXAMPLE 7

Replacement Passivation Layer+Organic Anti-Friction Layer

In the following example a variety of galvanized steel parts, for example small levers were obtained from Holder of Kirchheim-Teck Germany and used as test pieces. Test pieces passivated with a chromium m solution have been treated by Holder using their Novatec 100 process and compositions. The top-coat composition in accordance with present invention used was as defined in Sample 2 in Example 1 above and was applied in the same way as the method of application used for the protective coating composition described in Example 3 above. Comparative samples coated with a phosphatising step instead of a chromium III passivation layer were prepared by dipping a galvanized substrate into a solution of Phosbond W 520 from Wunsch-Chemie and drying at 80° C. The Organic anti-friction coatings were applied by dip-spinning and were subsequently cured as follows:

| | |
|---|---|
| Molykote ® D708 | 20 minutes at 200° C. |
| Molykote ® D106 | 60 minutes at 200° C. |
| Molykote ® D3484 | 10 minutes at 170° C. |
| Molykote ® 7400 | 15 minutes at 23° C. |

The coated products prepared as shown in Table 5 were then tested using the salt spray test DIN 50021 as previously described in Example 4 above and the results are also provided in Table 5 below.

TABLE 5

| Surface treatment | | | Time Taken for initial observation of rust (coverage of 2% of surface) (Hours) | |
|---|---|---|---|---|
| galvanic layer | passivation | Organic Anti-Friction Coating | white rust | red rust |
| ZnNi | None | None | 24 | 228 |
| ZnNi | None | Molykote ® D708 2 coats | 120 | 528 |
| ZnNi | Cr III based | Molykote ® D708 2 coats | 120 | 648 |
| ZnNi | Top-Coat 1 layer | Molykote ® D708 2 coats | 192 | 576 |
| ZnNi | Top-coat 2 layers | Molykote ® D708 2 coats | 216 | 672 |
| ZnNi | Cr III based | Molykote ® D106 2 coats | 24 | 72 |
| ZnNi | Phosbond W 520 | Molykote ® D106 2 coats | 24 | 72 |
| ZnNi | Top-coat 1 layer | Molykote ® D106 2 coats | 48 | 72 |
| ZnNi | Cr III based | Molykote ® D3484 2 layers | 24 | 72 |
| ZnNi | Phosbond W 520 | Molykote ® D3484 2 layers | 24 | 72 |
| ZnNi | Top-coat 1 layer | Molykote ® D3484 2 layers | 72 | 144 |
| ZnNi | Top-coat 2 layers | Molykote ® D3484 2 layers | 96 | 576 |
| ZnNi | Cr III based | None | 24 | 228 |
| ZnNi | Top-coat 1 layer | Molykote ® 7400 2 layers | 48 | 96 |
| ZnNi | Top-coat 2 layers | Molykote ® 7400 2 layers | 72 | 168 |

It will be seen from Table 5 that each sample coated with the protective coating composition of the present invention instead of a chromium III passivation or phosphatisation layer gave significantly better white rust and red rust results compared to the prior art, except for the samples having a Molykote® D106 samples where an improved result was observed with respect to white rust appearance.

The invention claimed is:

1. A protective coating composition comprising a silicate selected from the group consisting of organic silicates, organic polysilicates and colloidal silica, a lubricant comprising a wax, and an organic titanate in a solvent, which composition is free from metal particles.

2. A composition in accordance with claim 1 comprising 30 to 60% by weight silicate, and 40 to 70% by weight organic titanate to a total of 100% by weight of the combined silicate and organic titanate.

3. A composition in accordance with claim 1 wherein the silicate is selected from the group consisting of colloidal silica, silicate ester monomers, silicate ester polymers and silicate ester hydrolysates.

4. A composition in accordance with claim 3 wherein the silicate is an alkyl polysilicate.

5. A composition in accordance with claim 1 wherein the organic titanate is selected from a titanate chelate and a titanate ester.

6. A composition in accordance with claim 1 which further includes an anti-corrosion additive.

7. A composition in accordance with claim 6 wherein the anti-corrosion additive comprises a metal phosphate.

8. A composition in accordance with claim 1 wherein the wax is selected from the group consisting of
   (i) hydrocarbon waxes and
   (ii) polytetraethylene wax.

9. A composition in accordance with claim 1 which further includes a thickener.

10. A composition in accordance with claim 1 having a solids content comprising from 54 to 90% by weight of the silicate and organic titanate, up to 33% by weight of a metal phosphate, up to 8% by weight of a lubricant, and up to 4% by weight of a thickener.

11. A substrate having a protective coating formed from up to 3 coating layer(s) of a composition in accordance with claim 1.

12. A substrate having a protective coating in accordance with claim 11 wherein the protective coating has been applied on to a galvanically deposited zinc or zinc alloy surface.

13. A substrate in accordance with claim 11 wherein an organic anti-friction coating has been applied over the protective coating.

14. A substrate having a protective coating in accordance with claim 11 wherein the protective coating has been applied on to a surface comprising an anti-corrosion coating.

15. A substrate in accordance with claim 11 wherein the substrate is selected from the group consisting of nuts, bolts, other fasteners, door, car hood locking parts, trunk lid locking parts, hinges, door stoppers, window guides, seat belt components, brake rotors, and brake drums.

16. A composition in accordance with claim 8 wherein the hydrocarbon wax is a polyolefin-containing wax.

* * * * *